United States Patent [19]

Yaggi, Jr.

[11] 4,189,407

[45] Feb. 19, 1980

[54] CHLORINATED HYDROCARBONS AND POLYSULFIDE RUBBER SEALANT COMPOSITIONS INCORPORATING SAME

[75] Inventor: Cyril J. Yaggi, Jr., Pittsburgh, Pa.

[73] Assignee: Neville Chemical Company, Pittsburgh, Pa.

[21] Appl. No.: 734,039

[22] Filed: Oct. 20, 1976

[51] Int. Cl.$^2$ ............................................... C08L 91/00
[52] U.S. Cl. ............................ 260/18 R; 260/33.8 R; 260/37 R
[58] Field of Search ................. 260/33.8 R, 660, 18 R

[56] References Cited

U.S. PATENT DOCUMENTS

| | | | |
|---|---|---|---|
| 3,567,610 | 3/1971 | Krol et al. | 260/660 |
| 3,770,678 | 11/1973 | Paul | 260/33.8 R |
| 3,848,006 | 11/1974 | Sparks | 260/660 |
| 3,896,183 | 7/1975 | Henderson et al. | 260/660 |
| 3,919,338 | 11/1975 | Henderson et al. | 260/660 |

OTHER PUBLICATIONS

Modern Plastics Encyclopedia, 1968, (McGraw-Hill), (N.Y.), Sep. 1967, pp. 476–477.

*Primary Examiner*—Lewis T. Jacobs
*Attorney, Agent, or Firm*—Burns, Doane, Swecker & Mathis

[57] ABSTRACT

An improved chlorinated hydrocarbon is provided which is uniquely compatible with polysulfide rubber sealant formulations when incorporated as a plasticizer therein. Paraffins or alpha-olefins containing from 16 to 20 carbon atoms per molecule or mixtures or blends of paraffins or alpha-olefins containing 16 to 20 carbon atoms per molecule are chlorinated to a final chlorine content of from between 52 and 58 weight percent chlorine. The chlorinated hydrocarbons are compatible with polysulfide rubber sealant formulations while still maintaining the necessary low viscosity and volatility when incorporated as a plasticizer therein. A modified polysulfide rubber sealant formulation is disclosed which incorporates as a plasticizer the improved chlorinated hydrocarbon, and which is useful as a glass or window sealant. The improved plasticizer is non-fogging in a polysulfide rubber formulation.

16 Claims, No Drawings

CHLORINATED HYDROCARBONS AND POLYSULFIDE RUBBER SEALANT COMPOSITIONS INCORPORATING SAME

BACKGROUND OF THE INVENTION

The use of chlorinated, aromatic hydrocarbons as modifiers and plasticizers for plastic and rubber compounds is well known. Polychlorinated biphenyls, for example, have commonly served in the past as a major source of plasticizers for polysulfide rubber sealant compositions, due to their unique compatibility with such compositions. Recently, however, it has been determined that certain of the most widely-used polychlorinated biphenyls are accumulating over long periods of time in the environment at undesirable levels. This continued presence in the environment of the polychlorinated biphenyls is due to the fact that they are relatively stable and tend not to degrade. Often, rivers and streams are polluted by the dumping of polychlorinated biphenyls as chemical plant waste material. Once in the waterways, the polychlorinated biphenyls are a toxic pollutant which is very expensive to remove and highly destructive to the environment. Even when incorporated in synthetic resin compositions, for example, in a polysulfide rubber sealant formulation, the polychlorinated biphenyls are a source of environmental contamination, by way of sealant decomposition or minor plasticizer exudation.

As a result of the severe environmental hazards posed by the continued use of polychlorinated biphenyls, their manufacture and subsequent incorporation into polysulfide rubber sealant formulations has been virtually eliminated.

In recent years, increasing efforts have been directed at attempts to provide a substitute for polychlorinated biphenyls as plasticizers in plastic and rubber compositions which has the necessary compatibility so as not to exude or bleed off in any significant amount from a cured polysulfide rubber sealant composition into which it is incorporated. Such exudation causes an undesirable loss of adhesion in the rubber product. Chlorinated liquid paraffins, which are less stable than the polychlorinated biphenyls and more readily degradable, thus eliminating any possibility of environmental contamination due to long term accumulation of the contaminant, have been investigated. U.S. Pat. Nos. 3,770,678 and 3,925,331, for example, generally disclose the incorporation of a chlorinated liquid paraffin into a polysulfide rubber sealant or caulking composition, and are herein incorporated by reference.

U.S. Pat. No. 3,770,678 discloses a polysulfide latex-based composition consisting essentially of a water dispersion of a particular high-molecular weight polysulfide polymer, a particular polythiol polymer, and a special purpose additive selected from several compositions including plasticizers. Among the plasticizers mentioned therein are chlorinated biphenyls and chlorinated paraffins.

U.S. Pat. No. 3,925,331 discloses a curable sealant composition which is the reaction product of a polysulfide and a mercapto group-containing silane which may include a plasticizer and/or a filler. The plasticizer may be selected from, amongst others, chlorinated polyphenyls, nitrated aromatic compounds, phthalates and chlorinated liquid paraffins.

This prior art suffers from several serious deficiencies. First, it fails to recognize the environmental hazards of incorporating chlorinated polyphenyls as sealant composition plasticizers, as discussed in detail above. Further, many of the plasticizers contemplated by these broad teachings are too volatile to be successfully incorporated in or are incompatible with a stable polysulfide rubber sealant formulation. Further, many of those plasticizers can not be readily incorporated into polysulfide sealant formulations in amounts large enough to result in an economically priced sealant.

Japanese disclosed patent No. SHO-48-59151 teaches the incorporation of chlorinated paraffins as plasticizers for a liquid polysulfide composite. This prior art, like the two United States patents discussed above, fails to appreciate that such plasticizers can be too volatile to be formulated into an acceptable stable polysulfide rubber sealant composition, and/or can suffer significant heat loss, and/or can be so viscous as to be virtually unworkable and require dilution or cutting with other less viscous materials.

The incorporation of a chlorinated alpha-olefin containing an average of 6 to 18 carbon atoms per molecule and generally from about 20 to 73 weight percent chlorine or a chlorinated paraffin containing an average of 8 to 16 carbon atoms per molecule and generally from about 10 to 75 weight percent chlorine as a plasticizer generally for plastic and rubber compounds is also known. Particular examples include, e.g., products chlorinated to from 50 to 70 weight percent. See, for example, commonly assigned U.S. Pat. Nos. 3,896,183 and 3,919,338 which are herein incorporated by reference.

Again, there is no recognition in these patents or any of the prior art of chlorinated paraffins or alpha-olefins which are rendered compatible and non-fogging in a polysulfide rubber sealant formulation, which paraffins or alpha-olefins may be incorporated with a liquid polysulfide polymer to form a stable polysulfide rubber sealant formulation.

In summary, attempts to use all of these known chlorinated paraffins and alpha-olefins as plasticizers for a polysulfide rubber formulation have proved unsuccessful since these known plasticizers do not exhibit the necessary high degree of compatibility with a cured polysulfide rubber formulation while still retaining satisfactory volatility and viscosity characteristics, and the search for a satisfactory plasticizer has continued.

It is, therefore, an object of the invention to provide an improved chlorinated hydrocarbon composition which is highly compatible with a polysulfide rubber sealant formulation while still retaining a satisfactory volatility and viscosity for use therein, and which is non-fogging.

It is an object of the invention to provide an improved chlorinated hydrocarbon composition which will avoid the problem of environmental contamination due to long term accumulation.

It is an object of the invention to provide an improved chlorinated hydrocarbon plasticizer which when incorporated in a polysulfide rubber formulation will avoid the problem of environmental contamination due to long term accumulation.

It is a further object of the present invention to provide an improved polysulfide rubber formulation which incorporates a highly compatible chlorinated hydrocarbon plasticizer having a sufficiently low volatility and viscosity, the polysulfide rubber formulation not being subject to significant weight loss and the chlorinated hydrocarbon plasticizer not being subject to significant heat loss.

It is a further object of this invention to provide an improved polysulfide rubber formulation incorporating a chlorinated hydrocarbon plasticizer which eliminates the possibility of environmental contamination due to long term accumulation of the plasticizer in the environment, and which is useful as a glass or window sealant.

Other objects include the provision of methods for chlorinating the improved chlorinated hydrocarbon composition and for preparing the improved polysulfide rubber sealant formulation.

These and other objects and advantages of the improved chlorinated hydrocarbon composition and polysulfide rubber formulation incorporating the same, as well as their scope, nature and utilization will be apparent to those skilled in the art from the following description and appended claims.

SUMMARY OF THE INVENTION

It has been found that an improved chlorinated hydrocarbon composition consisting essentially of a chlorinated hydrocarbon selected from chlorinated paraffins or chlorinated alpha-olefins containing 16 to 20 carbon atoms per molecule and mixtures or blends of such paraffins or alpha-olefins, the chlorinated hydrocarbon having a chlorine content of from 52 to 58 weight percent, are useful as plasticizers for polysulfide rubber sealant formulations. The improved chlorinated hydrocarbon composition has a combination of both number of carbon atoms per molecule and chlorine content sufficient to provide a non-fogging and compatible plasticizer in such a sealant formulation.

In a preferred embodiment of the invention, the improved chlorinated hydrocarbon to be incorporated into the polysulfide rubber sealant formulation consists essentially of chlorinated paraffins containing 16 to 18 carbon atoms per molecule, chlorinated alpha-olefins containing 16 to 18 carbon atoms per molecule, and mixtures thereof. The improved chlorinated hydrocarbon has a viscosity of less than 40,000 centipoises at 25° C. and has a heat loss value of less than about 0.5 weight percent.

In another preferred embodiment of the invention, the improved chlorinated hydrocarbon to be incorporated into the polysulfide rubber sealant formulation consists essentially of a chlorinated mixture of equal parts of an alpha-olefin containing 16 carbon atoms per molecule and an alpha-olefin containing 20 carbon atoms per molecule, the chlorine content of the chlorinated mixture ranging from 52 to 55 weight percent. The improved chlorinated mixture has a viscosity of less than about 25,000 centipoises at 25° C. and has a heat loss value of less than about 0.5 weight percent.

In a particularly preferred embodiment, the improved chlorinated hydrocarbon to be incorporated into the polysulfide rubber sealant formulation consists essentially of an alpha-olefin containing 18 carbon atoms per molecule, i.e., 1-octadecene, which has a chlorine content of 54 to 55.5 weight percent level and a viscosity of less than 30,000 centipoises at 25° C., and a heat loss value of less than about 0.5 weight percent.

In another particularly preferred embodiment, the improved chlorinated hydrocarbon to be incorporated into the polysulfide rubber sealant formulation consists essentially of an alpha-olefin containing 16 carbon atoms per molecule, i.e., 1-hexadecene, which has a chlorine content of 54 to 55.5 weight percent level and a viscosity of less than 10,000 centipoises at 25° C., and a heat loss value of less than about 0.5 weight percent.

In another aspect of this invention, it has been found that an improved polysulfide rubber sealant formulation which is stable when cured comprising a liquid polysulfide polymer and a chlorinated hydrocarbon plasticizer consisting essentially of a chlorinated hydrocarbon selected from chlorinated paraffins or chlorinated alpha-olefins containing 16 to 20 carbon atoms per molecule and mixtures or blends of such paraffins or alpha-olefins, the chlorinated hydrocarbon having a chlorine content of from 52 to 58 weight percent, results in a stable formulation when cured. The chlorinated hydrocarbon plasticizer has a combination of both number of carbon atoms per molecule and chlorine content sufficient to be non-fogging and compatible in such a sealant formulation.

In a preferred embodiment of this aspect, the chlorinated hydrocarbon plasticizer which is incorporated into the polysulfide rubber sealant formulation consists essentially of chlorinated paraffins containing 16 to 18 carbon atoms per molecule, chlorinated alpha-olefins containing 16 to 18 carbon atoms per molecule, and mixtures thereof. The improved chlorinated hydrocarbon has a viscosity of less than about 40,000 centipoises at 25° C. and has a heat loss value of less than 0.5 weight percent.

In another preferred embodiment of this aspect of the invention, the chlorinated hydrocarbon plasticizer which is incorporated into the polysulfide rubber sealant formulation consists essentially of a chlorinated mixture of equal parts of an alpha-olefin containing 16 carbon atoms per molecule and an alpha-olefin containing 20 carbon atoms per molecule, the chlorine content of the chlorinated mixture ranging from 52 to 55 weight percent. The improved chlorinated alpha-olefin mixture has a viscosity of less than about 25,000 centipoises at 25° C. and has a heat loss value of less than 0.5 weight percent.

In a particularly preferred embodiment of this aspect of the invention, the chlorinated hydrocarbon plasticizer which is incorporated into the polysulfide rubber sealant formulation consists essentially of a chlorinated alpha-olefin containing 18 carbon atoms per molecule, i.e., 1-octadecene, which has a chlorine content of 54 to 55.5 weight percent level, a viscosity of less than 30,000 centipoises at 25° C., and a heat loss value of less than about 0.5 weight percent.

In another particularly preferred embodiment of this aspect of the invention, the chlorinated hydrocarbon plasticizer which incorporated into the polysulfide rubber sealant formulation consists essentially of a chlorinated alpha-olefin containing 16 carbon atoms per molecule, i.e., 1-hexadecene, which has a chlorine content of 54 to 55.5 weight percent level, a viscosity of less than 10,000 centipoises at 25° C., and a heat loss value of less than about 0.5 weight percent.

In another aspect of this invention, an improved chlorinated hydrocarbon plasticizer which is incorporated into the polysulfide rubber sealant formulation consists essentially of a chlorinated alpha-olefin containing 18 carbon atoms per molecule having a chlorine content ranging from 54 to 55.5 weight percent, a viscosity of less than about 30,000 centipoises at 25° C., a heat loss value of less than 0.5 weight percent. The chlorinated hydrocarbon plasticizer, which has a combination of both number of carbon atoms per molecule and chlorine content sufficient to be non-fogging and compatible in the sealant formulation, is mixed together with a liquid polysulfide polymer, a pigment, a retarding agent and a filler, and the formulation is cured to a stable condition by the incorporation of an effective amount of a curing agent.

In a particularly preferred embodiment of this aspect, the sealant formulation contains from about 25 to about 100 parts by weight of the $C_{18}$ chlorinated alpha-olefin, from about 5 to about 20 parts by weight titanium dioxide pigment, from about 0.1 to about 5 parts by weight stearic acid retarding agent and from about 25 to about 100 parts by weight of a carbon black, clay, or calcium carbonate filler per 100 parts by weight of thiol-terminated liquid polysulfide polymer. The curing paste contains equal parts by weight of lead dioxide and phthalate ester and is present in an amount from about 5 to about 10 parts by weight per 100 parts of the polysulfide polymer.

In another embodiment of this aspect, an improved chlorinated hydrocarbon plasticizer which is incorporated into the polysulfide rubber sealant formulation consists essentially of a chlorinated alpha-olefin containing 16 carbon atoms per molecule having a chlorine content ranging from 54 to 55.5 weight percent, a viscosity of less than about 10,000 centipoises at 25° C., a heat loss value of less than 0.5 weight percent. The chlorinated hydrocarbon plasticizer, which has a combination of both number of carbon atoms per molecule and chlorine content sufficient to be non-fogging and compatible in the sealant formulation, is mixed together with a liquid polysulfide polymer, a pigment, a retarding agent and a filler, and the formulation is cured to a stable condition by the incorporation of an effective amount of curing agent.

In a particularly preferred embodiment of this aspect, the sealant formulation contains from about 25 to about 100 parts by weight of the $C_{16}$ chlorinated alpha-olefin, from about 5 to about 20 parts by weight titanium dioxide pigment, from about 0.1 to about 5 parts by weight stearic acid retarding agent and from about 25 to about 100 parts by weight of a carbon black, clay, or calcium carbonate filler per 100 parts by weight of thiol-terminated liquid polysulide polymer. The curing paste contains equal parts by weight of lead dioxide and phthalate ester and is present in an amount from about 5 to about 10 parts by weight per 100 parts of the polysulfide polymer.

In yet another aspect, methods are provided for preparing the improved chlorinated hydrocarbon compositions and the improved polysulfide rubber sealant formulations of this invention.

One embodiment comprises chlorinating a hydrocarbon consisting essentially of paraffins or alpha-olefins containing from 16 to 20 carbon atoms per molecule or mixtures thereof to a chlorine content ranging from 52 to 58 weight percent to produce an improved chlorinated hydrocarbon having a combination of carbon atoms per molecule and chlorine content sufficient to provide a non-fogging and compatible plasticizer in a polysulfide rubber sealant composition.

In a preferred embodiment of this aspect, a hydrocarbon consisting essentially of an alpha-olefin containing 18 carbons atoms per molecule is chlorinated to a chlorine content ranging from 54 to 55.5 weight percent.

In another preferred embodiment of this aspect, a chlorinated hydrocarbon consisting essentially of an alpha-olefin containing 16 carbon atoms per molecule is chlorinated to a chlorine content ranging from 54 to 55.5 weight percent.

Methods are provided for preparing improved polysulfide rubber sealant formulations comprising mixing these improved chlorinated hydrocarbon compositions together with a liquid polysulfide polymer to provide a sealant formulation which is stable when cured.

Methods are also provided for curing the improved polysulfide rubber sealant formulation. An alpha-olefin containing 18 carbon atoms per molecule is chlorinated to a chlorine content ranging from 54 to 55.5 weight percent and mixed together with a liquid polysulfide polymer, a pigment, a retarding agent and a filler and an amount of a curing agent is incorporated effective to cure the formulation.

Preferably, from about 25 to about 100 parts by weight of the chlorinated alpha-olefin is mixed together with from about 5 to about 20 parts by weight of a titanium dioxide pigment, from about 0.1 to about 5 parts by weight of a stearic acid retarding agent, and from about 25 to about 100 parts by weight of a carbon black, clay or calcium carbonate filler per 100 parts by weight of a thiol-terminated polysulfide polymer. A curing paste containing equal parts by weight of lead dioxide and phthalate ester is incorporated in an amount from about 5 to about 10 parts by weight per 100 parts of the polysulfide polymer and effective to cure the sealant formulation.

Methods are also provided for curing the improved polysulfide rubber sealant formulation. An alpha-olefin containing 16 carbon atoms per molecule is chlorinated to a chlorine content ranging from 54 to 55.5 weight percent and mixed together with a liquid polysulfide polymer, a pigment, a retarding agent and a filler and an amount of a curing agent is incorporated effective to cure the formulation.

Preferably, from about 25 to about 100 parts by weight of the chlorinated alpha-olefin is mixed together with from about 5 to about 20 parts by weight of a titanium dioxide pigment, from about 0.1 to about 5 parts by weight of a stearic acid retarding agent, and from about 25 to about 100 parts by weight of a carbon black, clay or calcium carbonate filler per 100 parts by weight of a thiol-terminated polysulfide polymer. A curing paste containing equal parts by weight of lead dioxide and phthalate ester is incorporated in an amount from about 5 to about 10 parts by weight per 100 parts of the polysulfide polymer and effective to cure the sealant formulation.

DESCRIPTION OF THE PREFERRED EMBODIMENTS

The hydrocarbon or hydrocarbons which are used to prepare the improved chlorinated hydrocarbon of this invention may be natural or synthetic in origin and may be liquids or solids at room temperature (i.e., ambient conditions at about 25° C.). The hydrocarbons are either paraffins or alpha-olefins. The term "paraffins" as used herein designates a class of aliphatic hydrocarbons having the general formula $C_nH_{2n+2}$, where n is greater than or equal to 1, preferably normal paraffins. Paraffins are also referred to in the art as alkanes. The term "alpha-olefins" as used herein designates a class of unsaturated aliphatic hydrocarbons having the general formula $C_nH_{2n}$, wherein n is greater than or equal to 2, and which are particularly reactive because of the presence of a double bond within the hydrocarbon molecule at a position intermediate a terminal carbon atom and the next carbon adjacent thereto. In particular, normal alpha-olefins are preferred. The term "non-fogging" as used herein designates a particular chlorinated hydrocarbon which when incorporated into a polysulfide rubber sealant composition and placed adjacent to a clear or transparent glass surface, e.g., as when used as a sealant for window glass, does not cause the window glass to cloud over a period of time.

In particular, the term "non-fogging" refers to a chlorinated hydrocarbon which passes the following test. 75 g. of the chlorinated hydrocarbon are placed in a 38×305 mm. standard glass test tube which contains 50 ml. of about 3.2 mm. diameter glass beads. The test tube is corked with a stopper having a center hole, with a 20×150 mm. test tube snugly inserted in the hole. This test tube arrangement is inserted vertically into a silicone oil bath maintained at a temperature of about 71° C. to a level whereby the chlorinated paraffin level is about 76 mm. below the bath surface. The bath is covered except for a hole through which the test tube arrangement is inserted. The smaller test tube is arranged so that its bottom end is level with the bath cover and about 51 mm. above the silicone oil level. After about 24 hours of immersion in the bath, a chlorinated paraffin is "non-fogging" if the surface of the small test tube remains completely dry and clear or transparent.

The term "compatible" as used herein designates a chlorinated hydrocarbon plasticizer which when compounded with an equal part of a liquid polysulfide polymer in the "green" or uncured state forms a clear or transparent, single-phase solution, and further, which when compounded with a liquid polysulfide polymer formulation and cured or cross-linked does not exude or bleed off from the formulation.

In particular, in the "green" compounding compatibility test, 10 ml. of the sample chlorinated paraffin is compounded with an equal volume of THIOKOL® LP-2 polysulfide rubber in a 25×150 mm. glass test tube and the mixture is maintained at room temperature (i.e., about 25° C.) for a period of about 18 hours. A plasticizer which is "compatible" is one which, after the 18 hour period, is a visually clear or transparent solution. Incompatibility is signified by the presence of a visually clouded solution or one which is separated into two visually distinct layers at the termination of the test.

The term "weight percent" is used herein to signify weight percent based on the total weight of a particular hydrocarbon when chlorinated unless otherwise designated.

The term "stable when cured" designates a polysulfide rubber sealant formulation which has a maximum weight loss which is not significant, i.e., less than 5.0 weight percent (based on the total weight of the chlorinated hydrocarbon plasticizer and the polysulfide polymer formulation) when heated for about 24 hours (one day) at about 70° according to ASTM Test Designation D 1203-67, which is herein incorporated by reference.

The term "heat loss value" as used herein refers to the weight percent of a particular chlorinated hydrocarbon which is lost when the chlorinated hydrocarbon is exposed to an elevated temperature of about 105° C. for about 24 hours according to ASTM Test Designation D2288-69 performed without a rotating turntable.

The term "mixtures" as used herein designates combinations of either feed hydrocarbon streams or chlorinated hydrocarbon product.

The term "chlorinated alpha-olefin" as used herein designates an alpha-olefin which has been chlorinated.

The unchlorinated hydrocarbon from which the improved chlorinated hydrocarbon of this invention is produced must consist essentially of from 16 to 20 carbon atoms per molecule in order to obtain a sufficiently low volatility and viscosity to allow good plasticizing action, ease in handling, and long periods of satisfactory use without severe losses of adhesive properties when incorporated in a polysulfide rubber sealant formulation.

In general, if a hydrocarbon is chosen which contains less than 16 carbon atoms per molecule, the chlorinated hydrocarbon is too volatile for incorporation into a polysulfide rubber glass or window sealant formulation as contemplated in this invention. The high volatility causes glass to fog up and become opaque under conditions of elevated temperature for a period of time.

On the other hand, if a hydrocarbon is selected which contains more than 20 carbon atoms per molecule, the resulting product, while more satisfactory from a volatility standpoint, suffers from large increases in viscosity which render the chlorinated hydrocarbon so viscous as to make it very difficult to work with and lacking in the ease of compounding required for a glass or window sealant formulation. Further, the plasticizing effect of such a chlorinated hydrocarbon is reduced to an undesirably low level.

Minor amounts of hydrocarbons containing less than 16 carbon atoms per molecule, e.g., as few as 10 carbon atoms per molecule, or more than 20 carbon atoms per molecule, e.g., as many as 28 carbon atoms per molecule, may be included so long as they are not present in amounts sufficient to materially affect the fundamental, basic and novel characteristics of the chlorinated hydrocarbons and sealant formulations. Minor amounts would include, e.g., less than about 0.5 weight percent of high volatility constituents such as $C_8$ hydrocarbons chlorinated to about 55 weight percent, about 1.0 weight percent of, e.g., $C_{10}$ or $C_{12}$ hydrocarbons chlorinated to about 55 weight percent or less than about 20 weight percent of lower volatility constituents such as $C_{14}$ hydrocarbons chlorinated to about 55 weight percent. As the chlorine content is decreased, even lesser amounts of the various lower length hydrocarbons can be tolerated. Minor amounts would also include, e.g., less than about 1.0 weight percent of high viscosity constituents such as $C_{28}$ hydrocarbons chlorinated to about 55 weight percent or less than about 10 weight percent of lower viscosity constituents, such as $C_{24}$ hydrocarbons chlorinated to about 55 weight percent.

The improved $C_{16}$–$C_{20}$ chlorinated hydrocarbon of the present invention is chlorinated to from 52 to 58 weight percent. This combination of carbon atoms per molecule and range for chlorine content is critical to obtaining a chlorinated hydrocarbon which has the necessary compatibility, viscosity, and volatility for incorporation into a polysulfide rubber sealant formulation. $C_{16}$–$C_{20}$ chlorinated hydrocarbons with a chlorine content below this critical level either do not exhibit the necessary polysulfide rubber compatibility or have a volatility which is so high as to cause extensive window fogging at elevated temperatures over a period of time. $C_{16}$–$C_{20}$ chlorinated hydrocarbons with a chlorine content in excess of the critical range may exhibit extreme increases in viscosity which would render such hydrocarbons unworkable and therefore unusable as plasticizers in sealant formulations.

Viscosity of the improved chlorinated hydrocarbons may vary over a wide range, but must be low enough so that the hydrocarbons may be readily handled and processed for use as a sealant plasticizer. In general, the viscosity of the improved chlorinated hydrocarbons is below about 450,000 centipoises at 25° C. Preferably, the viscosity is less than about 40,000 centipoises at 25° C., most preferably below about 30,000 or about 25,000 centipoises at 25° C.

The chlorination reaction is carried out preferably at a temperature of from about 25° to 130° C., and most preferably at a temperature of from about 70° to about 120° C. Chlorine is reacted with the hydrocarbon by way of addition and substitution reactions with hydrogen chloride being formed as a by-product. If desired, the chlorination reaction initially may be carried out at a temperature of from about 25° to about 65° C. and subsequently elevated to from about 90° to 120° C. during the latter stages of the reaction. The chlorination is preferably carried out at substantially atmospheric pressure; however, slightly elevated pressures may be utilized. Chlorine preferably continuously is introduced into the hydrocarbon as a gas. The rate of chlorine introduction is preferably adjusted so as to approximate the rate of reaction attainable, and can be decreased should the rate of reaction become excessive, or increased should the rate of reaction become too low. The hydrocarbon undergoing chlorination is preferably stirred or otherwise agitated throughout the reaction.

The chlorination process of the present invention is preferably carried out in the presence of light to catalyze the reaction, although a catalyst may not be necessary in certain instances. Other catalysts such as Lewis acid catalysts, e.g., aluminum chloride and boron trifluoride, may also be used.

If desired, the use of a catalytic light source may be deferred until a significant degree of chlorination is achieved, e.g., until the product contains about 40% to about 50% chlorine.

Conventional actinic light sources commonly used in photochemical reactions may be selected from the following: fluorescent lamps, tungsten filament lamps, ordinary light bulbs, mercury vapor arc lamps such as a Hanovia light, and ultraviolet lamps. The light source may be placed directly inside the reactor, or next to an external recycling line through which the reactants circulate. Light wave lengths of below about 3000 angstrom units may produce harmful decomposition or an otherwise inferior product. Such wave lengths should be avoided and may be filtered out or eliminated as disclosed in U.S. Pat. Nos. 2,403,179 and 2,929,369, which are incorporated herein by reference.

Chlorine content as used herein refers to the amount of chlorine chemically fixed or bonded to the hydrocarbon molecules and not to any free chlorine or the chlorine content of any chlorinated solvent remaining in the chlorinated hydrocarbon material. Chlorine content can be conveniently measured by an Schoniger oxygen flask technique, e.g., ASTM Test Designation D 1638-59T (pp. 107–109) which is incorporated herein by reference, and which was modified to include 0.05 g. of test sample instead of 0.02 g. and a 0.025 N silver nitrate solution instead of 0.01 N solution.

If desired, an additive capable of overcoming trace amounts of iron contamination optionally may be provided in the reaction zone in accordance with the teachings of our commonly assigned U.S. Pat. No. 3,567,610, which is herein incorporated by reference.

The chlorination reaction may be terminated, e.g., by ceasing chlorine introduction when the desired degree of chlorination has been reached. The progress of the chlorination reaction may be simply monitored, e.g., by the periodic withdrawal of a sample followed by a specific gravity determination. For a further discussion of hydrocarbon chlorination techniques in general, see U.S. Pat. Nos. 3,896,183 and 3,919,338 which are incorporated herein by reference.

The polysulfide polymers which may be employed in the present invention and the process for their preparation are generally described, e.g., in *Rubber Chemistry and Technology*, Vol. 41, No. 1, February 1969, pp. 115–160 which is herein incorporated by reference. They include, e.g., thiol-terminated liquid polymers. They may be advantageously formed from a bis(2-chloroethyl) formal monomer and have molecular weights ranging from about 600 to about 80,000. Polysulfide polymers with a molecular weight of about 4,000, e.g., THIOKOL® LP-2 and THIOKOL® LP-32 polysulfide polymers, are readily available on a commercial basis and thus constitute a particularly advantageous source of thiol-terminated liquid polysulfide polymers.

The sealant formulations of the present invention may also contain a variety of materials commonly employed as additives such as fillers, extenders, plasticizers, pigments, adhesion promoters, curing systems, retarding agents and the like as described, e.g., in *Rubber Chemistry and Technology*, Vol. 41, No. 1, February 1969, pp. 115–160. The fillers which may be incorporated into the compositions of the present invention include, e.g., carbon black, various clays and calcium carbonate. The pigments contemplated may include, e.g., titanium dioxide. The retarding agents contemplated may include, e.g., stearic acid. The adhesion promoters may include, e.g., phenolic or epoxy resins. The amount and type of additive employed in the sealant composition of the present invention may be varied to suit the particular application for which the sealant composition is intended.

Curing systems which may be incorporated into the sealant compositions of the present invention in an amount effective to cure the compositions are described in detail in *Rubber Chemistry and Technology*, Vol. 41, No. 1, February 1969, pp. 115–160 and include, e.g., those incorporating oxidizing agents such as lead and manganese oxides or reactive epoxy resins.

The curing systems may also include a carrier such as phthlate ester or the improved chlorinated hydrocarbon composition of the invention.

EXAMPLE I

For Runs No. 1–12, a variety of hydrocarbon feeds were provided to be chlorinated to various levels of chlorine content by the process as described above. In each case, about 300 grams of alpha-olefin or normal paraffin was charged to a glass reactor vessel equipped with a temperature sensing means, sparger, sealed agitator and condensor. The reactions were carried out under ambient lighting conditions.

Each feed was heated with agitation to 85° C. and chlorine bubbled into the mixture. For the alpha-olefins, reaction was immediate and the temperature was allowed to surge to 110° C. For the normal paraffin reaction, chlorine was added at 85° C. with heating continually applied until this reaction mixture reached 105° C. at which point the reaction started. Chlorine addition was continued while maintaining temperature generally at 110°±5° C. until the required amount of chlorine had been added. Each product was then cooled and air blown for ½ hour while maintaining the temperature in the range of 80°–95° C. The product was neutralized in a conventional manner and air blowing continued for 15 additional minutes at the above temperatures. The products were all stabilized with a conventional stabilizer.

The chlorinated hydrocarbons obtained are described below in Table I as Runs No. 1–12.

Along with these twelve runs, two additional runs, the products of which are within the scope of this invention, were made. For these runs, the chlorination procedure of U.S. Pat. No. 3,896,183 was followed.

Following the chlorination procedure used for the twelve samples described above, additional samples were prepared. $C_{16}$-, $C_{18}$-, and $C_{20}$- normal paraffin samples were chlorinated to the 55% Cl level, within the scope of the invention. Several comparison samples, outside the scope of the invention, were also prepared. All these samples were prepared from feeds of a particularly high purity of over 96.0 mole percent with a maximum content of less than 1.0 mole percent of the next lower hydrocarbon with an even number of carbon atoms per molecule. The samples are described below in Table II.

TABLE II

| | | ADDITIONAL CHLORINATED LIQUID HYDROCARBON SAMPLES | | | | | |
|---|---|---|---|---|---|---|---|
| Run No. | Nature of Feed | Actual Weight Percent Chlorine Content | (Estimated Weight Percent Chlorine content | Viscosity-Centipoises at 26° C. | Fog[2.] Test | Heat Loss-Weight Percent after 24 hours at 105° C. | Compatibility |
| 18[1] | $C_8$ Normal Paraffin | 44.0 | (45) | 8.1 | Failed | −96.6 | Clear |
| 19[1] | $C_8$ Normal Parffin | 55.3 | (55) | 20 | Failed | −82.0 | Clear |
| 20[1] | $C_{10}$ Normal Paraffin | 47.2 | (45) | 21 | Failed | −44.10 | Clear |
| 21[1] | $C_{10}$ Normal Parffin | 54.4 | (55) | 134 | Failed | −14.98 | Clear |
| 22[1] | $C_{12}$ Normal Parffin | 43.9 | (45) | 40 | Failed | −13.00 | Cloudy[5] |
| 23[1] | $C_{12}$ Normal Parffin | 54.2 | (55) | 679 | Failed | −1.70 | Clear |
| 24[1] | $C_{14}$ Normal Parffin | 45.4 | (45) | 157 | Failed | −1.86 | Cloudy[5] |
| 25[1] | $C_{14}$ Normal Parffin | 54.2 | (55) | 3,824 | Failed | +0.09 | Clear |
| 26 | $C_{16}$ Normal Parffin | 44.6 | (45) | 654 | Failed | −0.09 | Incompatible[6] |
| 27 | $C_{16}$ Normal Parffin | 54.1 | (55) | 11,740 | Passed | +0.30 | Clear |
| 28 | $C_{18}$ Normal Parffin | 43.9 | (45) | 606 | Passed | +0.19 | Incompatible[6] |
| 29 | $C_{18}$ Normal Parffin | 53.3 | (55) | 28,950 | Passed | +0.26 | Clear |
| 30 | $C_{20}$ Normal Parffin | 45.6 | (45) | 2,388 | —[4] | +0.28 | Incompatible[6] |
| 31 | $C_{20}$ Normal Parffin | 54.1 | (55) | 117,400 | Passed | +0.24 | Clear |

[1]Denotes comparison run outside the scope of this invention.
[2]Samples 1-17 tested at about 71° C.; Samples 18-31 tested at about 77° C.
[3]All tests performed at designated temperature for 24 hours (1 day). Samples 1-17 carried out for an additional three days with no changes in results.
[4]Data not available — test sample depleted
[5]Solution visibly clouded.
[6]Separated into two visibly distinct layers.

These are described below in Table I as Runs No. 13 and 14.

For comparison purposes, three known plasticizers were selected. Those samples are described below in Table I as Runs No. 15–17.

EXAMPLE II

Fog tests were performed on all the samples, the results of which are set forth in Tables I and II.

TABLE I

| | | Chlorinated Liquid Hydrocarbon and Comparison Samples | | | | |
|---|---|---|---|---|---|---|
| Run No. | Nature of Feed | Actual Weight Percent Chlorine Content | (Estimated weight Percent Chlorine Content) | Viscosity-Centipoises at 25° C. | Fog Test[2,3] | Heat Loss - Weight Percent after 24 hours at 105° C. |
| 1 | $C_{16}$ alpha-olefin | 51.4 | (52) | 1,600 | Passed[4] | −0.32 |
| 2 | $C_{16}$ alpha-olefin | 54.0 | (55) | 5,200 | Passed | −0.14 |
| 3 | $C_{16}$ alpha-olefin | 57.5 | (58) | 31,200 | Passed | −0.16 |
| 4 | $C_{18}$ alpha-olefin | 51.4 | (52) | 4,115 | Passed | −0.22 |
| 5 | $C_{18}$ alpha-olefin | 54.3 | (55) | 17,740 | Passed | −0.13 |
| 6 | $C_{18}$ alpha-olefin | 55.1 | (55) | 26,500 | Passed[4] | −0.12 |
| 7 | $C_{18}$ alpha-olefin | 57.8 | (58) | 161,000 | Passed | −0.10 |
| 8 | $C_{18}$ normal paraffin | 54.7 | (55) | 34,020 | Passed | −0.11 |
| 9 | $C_{20}$ alpha-olefin | 51.4 | (52) | 10,700 | Passed | −0.20 |
| 10 | $C_{20}$ alpha-olefin | 54.9 | (55) | 66,000 | Passed | −0.14 |
| 11 | $C_{20}$ alpha-olefin | 57.7 | (58) | 410,000 | Passed | −0.12 |
| 12 | Equal parts of $C_{16}/C_{20}$ alpha-olefin blend | 54.7 | (55) | 20,000 | Passed | −0.17 |
| 13 | $C_{18}$ alpha-olefin[1] | 54.8 | — | 21,865 | Passed | −0.40 |
| 14 | $C_{18}$ alpha-olefin[1] | 54.4 | — | 22,120 | Passed | −0.30 |
| 15 | Unichlor® 50 L 50 ($C_{10}$-$C_{13}$ paraffin) | 52.8 | (50) | 543 | Failed | −13.40 |
| 16 | Unichlor® 60 L 60 ($C_{10}$-$C_{12}$ paraffin) | 59.0 | (60) | 1,750 | Failed | −5.40 |
| 17 | Santicizer® 278 (phthalate ester) | none | none | 663 | Failed | Not Tested |

[1]Prepared in accordance with the procedure of U.S. Pat. No. 3,896,183, herein incorporated by reference.
[2]Samples 1-17 tested at about 71° C.; Samples 18-31 tested at about 77° C.
[3]All tests performed at designated temperature for 24 hours (1 day). Samples 1-17 carried out for an additional three days with no change in results.
[4]Very small amount of accumulation on glass surface.

In these tests, a large test tube containing 75 grams of a sample plasticizer and 50 ml. of glass beads (for weighing purposes and level control) was prepared for each sample. The test tubes were corked with a stopper having an aperture in the center and a small test tube was placed snugly through the aperture. These small test tubes acted as an air-cooled cold finger type condenser, providing a surface on which any volatilized paraffin might deposit. The double test tube arrangement was partially immersed in a hot oil bath kept at a temperature of from about 71° C. to about 77° C., such that the temperature of the upper tube was about 42° C. to about 49° C. The chlorinated hydrocarbons of the invention were all non-fogging.

EXAMPLE III

All of the samples except Run No. 17 were tested to determine heat loss values. Each sample was exposed to an elevated temperature of about 105° C. for a period of about 24 hours. The results appear in Tables I and II.

As may be seen from these results, all of the $C_{16}$-$C_{20}$ chlorinated hydrocarbons within the scope of this invention are stable and non-volatile products which are not subject to significant heat loss, i.e., maintain a heat loss value of less than 0.5 weight percent.

EXAMPLE IV

Each plasticizer sample of Example I was incorporated into a polysulfide rubber sealant formulation and the performance of the sealant formulations incorporating each of the sample plasticizers was determined. The sealant composition and curing paste used to prepare the various sample formulations are described below:

Sealant Composition

| Ingredient | Parts by Weight |
|---|---|
| THIOKOL ® LP-2 Polysulfide polymer[1] | 50 |
| THIOKOL ® LP-32 Polysulfide polymer[2] | 50 |
| Sample chlorinated liquid Hydrocarbon | 25 |
| Filler (Keystone White - Calcium Carbonate) | 45 |
| Pigment (titanium dioxide) | 15 |
| Retarding Agent (Stearic Acid) | 0.3 |
| Total | 185.3 |

Curing Paste

| Ingredient | Parts by Weight |
|---|---|
| Plasticizer (SANCTICIZER ® 278-phthalate ester) | 7.5 |
| Catalyst (lead dioxide - $PbO_2$) | 7.5 |
| Total | 15.0 |

[1]LP-32 polysulfide polymer is a liquid thiol-terminated polysulfide polymer having essentially the structure HS—($C_2H_4$—O—$CH_2$—O—$C_2H_4$—SS)$_{23}$—$C_2H_4$—O—$CH_2$O—O—$C_2H_4$—SH with about 0.5% crosslinking or branching and a molecular weight of about 4,000.
[2]LP-2 polysulfide polymer has essentially the same structure as LP-32 polysulfide polymer with about 2.0% crosslinking or branching imparted by 1,2,3-trichloropropane.

The sealant composition and curing paste were compounded separately by mixing the necessary ingredients and subsequently subjecting the mixtures to several passes on a three-roll paint mill. The sealant composition and curing paste were then blended in the proportions shown until a uniform color was obtained. After blending, the sealant formulation was press-cured overnight at room temperature (about 25° C.) in a standard ASTM cavity mold and subsequently aged for seven days.

After curing and aging, performance tests were carried out on the sealant formulations to determine the compatibility of the sample plasticizers with the polysulfide rubber and the stability of the formulations.

To determine the stability of the cured polysulfide rubber sealant formulations, the formulations of Runs No. 1-17 were subjected to an elevated temperature of about 70° C. for a period of about 24 hours. Weight loss measurements were taken, and are reported in Table III:

TABLE III
Weight Loss Measurements in Cured Formulations

| Run No. | Nature of Feed | Actual Weight Percent Chlorine Content | (Estimated Weight Percent Chlorine Content) | Weight % Loss of Plasticizer [1,3] |
|---|---|---|---|---|
| 1 | $C_{16}$ alpha-olefin | 51.4 | (52) | −4.38 |
| 2 | $C_{16}$ alpha-olefin | 54.0 | (55) | −3.97 |
| 3 | $C_{16}$ alpha-olefin | 57.5 | (58) | −3.29 |
| 4 | $C_{18}$ alpha-olefin | 51.4 | (52) | −3.74 |
| 5 | $C_{18}$ alpha-olefin | 54.3 | (55) | −3.45 |
| 6 | $C_{18}$ alpha-olefin | 55.1 | (55) | −3.33 |
| 7 | $C_{18}$ alpha-olefin | 57.8 | (58) | −3.35 |
| 8 | $C_{18}$ normal paraffin | 54.7 | (55) | −3.33 |
| 9 | $C_{20}$ alpha-olefin | 51.4 | (52) | −3.38 |
| 10 | $C_{20}$ alpha-olefin | 54.9 | (55) | −3.11 |
| 11 | $C_{20}$ alpha-olefin | 57.7 | (58) | −3.22 |
| 12 | Equal parts of $C_{16}$/$C_{20}$ alpha-olefin blend | 54.7 | (55) | −3.10 |
| 13 | $C_{18}$ alpha-olefin[2] | 54.8 | — | −3.99 |
| 14 | $C_{18}$ alpha-olefin[2] | 54.4 | — | −3.59 |
| 15 | Unichlor ® 50 L 50 ($C_{10}$—$C_{13}$ paraffin) | 52.8 | (50) | −7.35 |
| 16 | Unichlor ® 60 L 60 ($C_{10}$—$C_{12}$ paraffin) | 59.0 | (60) | −5.35 |
| 17 | Santicizer ® 278 (phthalate ester) | None | None | −4.34 |

[1]Based on total weight of plasticizer and sealant formulation.
[2]Prepared in accordance with the procedures of U.S. Pat. No. 3,896,183, herein incorporated by reference.
[3]Performed in accordance with ASTM Test Designation D 1203-67.

As can be seen from this data, the polysulfide rubber formulations of this invention, namely, Runs No. 1-14, were all satisfactory and showed excellent stability, with less than 5.0 weight percent loss in each case.

EXAMPLE V

The cured formulations of Runs 1-17 stored for one week at a constant temperature of 27° C. and 50% relative humidity were subjected to additional physical property tests.

It may be seen from this data that Runs No. 1-14 within the scope of the invention, when compared to the commercially acceptable plasticizer of Run 17 perform effectively, as shown in Table IV.

of the invention exhibits excellent compatibility without suffering from undesirable fogging.

Thus, the improved chlorinated hydrocarbon of the invention combines a high compatibility in polysulfide rubber sealant compositions with a volatility low enough to avoid fogging and a viscosity low enough to provide ease in handling to produce a plasticizer which is subject to very low heat loss and which results in a stable polysulfide rubber sealant formulation when blended therein.

TABLE IV

ADDITIONAL PHYSICAL PROPERTIES OF THE CURED SEALANT FORMULATION

| Run No.[3] | 300% Modulus[1] (PSI) | Tensile Strength Max[1] (PSI) | Elongation[1] % | Hardness Shore[2] |
|---|---|---|---|---|
| 1 | 103 | 108.0 | 345 | 28.0 |
| 2 | 112 | 125.0 | 405 | 31.0 |
| 3 | 110 | 113.0 | 350 | 31.5 |
| 4 | 107 | 119.0 | 405 | 30.0 |
| 5 | 111 | 118.0 | 375 | 31.5 |
| 6 | 114 | 129.0 | 440 | 32.0 |
| 7 | 115 | 122.0 | 355 | 32.5 |
| 8 | 112 | 126.0 | 430 | 32.0 |
| 9 | 105 | 114.0 | 395 | 30.5 |
| 10 | 114 | 131.0 | 455 | 32.0 |
| 11 | 116 | 133.0 | 445 | 32.5 |
| 12 | 112 | 123.0 | 400 | 31.0 |
| 13 | 109 | 116.0 | 365 | 31.5 |
| 14 | 108 | 113.0 | 355 | 31.0 |
| 15 |  | 94.0 | 270 | 27.0 |
| 16 | 113[4] | 118.0 | 340 | 31.0 |
| 17 | 97.9 | 114.0 | 485 | 27.0 |

[1]Test performed in accordance with ASTM Test Designation D-412-68, herein incorporated by reference.
[2]Test performed in accordance with ASTM Test Designation D-2240-75, herein incorporated by reference. A Shore A-2 durometer was used.
[3]For details of Runs, see Table I.
[4]Failed before reaching 300% modulus

EXAMPLE VI

To determine the compatibility of the sample chlorinated hydrocarbons in "green" or uncured polysulfide rubber, equal volume parts of the chlorinated normal paraffins of Runs No. 18-31 and THIOKOL® LP-2 rubber were mixed in solution and maintained at room temperature (about 25° C.) for about 18 hours and the following results were obtained. A "clear" solution would be indicative of a high or acceptable level of compatibility. A "cloudy" solution is one which is visibly clouded and represents an unacceptable level of compatibility. Those solutions which were "incompatible" were separated into two visibly distinct layers. The results of the "green" compatibility test are set forth in Table II above.

As may be seen from Table II, for the paraffins having a low number of carbon atoms per molecule, e.g., $C_8$-$C_{10}$ paraffins, a 45 weight percent chlorine content appears sufficient to provide the necessary compatibility, but these all have a volatility which is extremely high and which would result in extensive fogging. As the number of carbon atoms increases to, e.g., 12 or 14, the 45 weight percent chlorine content becomes insufficient to provide the compatibility necessary to a stable sealant formulation. While a 55 weight percent chlorine content for a $C_{12}$-$C_{14}$ paraffin yields a clear or compatible formulation, the volatility is again so high as to result in fogging. When the number of carbon atoms per molecule is increased to from 16 to 20, the 45 weight percent chlorine content results in definitely incompatible sealant formulations, as indicated by the appearance of two visibly distinct layers. At the 55 weight percent level, however, the improved chlorinated hydrocarbon Although the invention has been described with preferred embodiments, it is to be understood that variations and modifications may be resorted to as will be apparent to those skilled in the art. Such variations and modifications are considered to be within the purview and the scope of the claims appended hereto.

I claim:

1. An improved polysulfide rubber sealant formulation comprising
    a liquid polysulfide polymer; and
    a chlorinated hydrocarbon plasticizer in an amount effective to plasticize said polysulfide polymer and consisting essentially of a chlorinated hydrocarbon selected from chlorinated paraffins containing from 16 to 20 carbon atoms per molecule, chlorinated alpha-olefins containing from 16 to 20 carbon atoms per molecule, and mixtures thereof; the chlorine content of the chlorinated hydrocarbon ranging from 52 to 58 weight percent; the chlorinated hydrocarbon plasticizer having a combination of (a) number of carbon atoms per molecule and (b) chlorine content sufficient to provide a non-fogging and compatible plasticizer in a polysulfide rubber sealant formulation; the polysulfide rubber sealant formulation being stable when cured.

2. An improved polysulfide rubber sealant formulation according to claim 1 wherein
    the liquid polysulfide polymer is thiol-terminated; the chlorinated hydrocarbon is selected from chlorinated paraffins containing from 16 to 18 carbon atoms per molecule, chlorinated alpha-olefins containing from 16 to 18 carbon atoms per molecule, and mixtures thereof; and
    the chlorinated hydrocarbon plasticizer has a viscosity of less than about 40,000 centipoises at 25° C.

and has a heat loss value of less than about 0.5 weight percent.

3. An improved polysulfide rubber sealant formulation comprising a liquid polysulfide polymer; and
a chlorinated hydrocarbon plasticizer in an amount effective to plasticize said polysulfide polymer and consisting essentially of a chlorinated alpha-olefin containing 18 carbon atoms per molecule; the chlorine content of the chlorinated alpha-olefin ranging from 54 to 55.5 weight percent; the chlorinated hydrocarbon plasticizer having a combination of (a) a number of carbon atoms per molecule and (b) chlorine content sufficient to provide a non-fogging and compatible plasticizer in a polysulfide rubber sealant formulation; the chlorinated hydrocarbon plasticizer having a viscosity of less than about 30,000 centipoises at 25° C. and having a heat loss value of less than about 0.5 weight percent; the liquid polysulfide polymer being thiol-terminated; and the polysulfide rubber sealant formulation being stable when cured.

4. An improved polysulfide rubber sealant formulation comprising a liquid polysulfide polymer; and
a chlorinated hydrocarbon plasticizer in an amount effective to plasticize said polysulfide polymer and consisting essentially of a chlorinated alpha-olefin containing 16 carbon atoms per molecule; the chlorine content of the chlorinated alpha-olefin ranging from 54 to 55.5 weight percent; the chlorinated hydrocarbon plasticizer having a combination of (a) number of carbon atoms per molecule and (b) chlorine content sufficient to provide a non-fogging and compatible plasticizer in a polysulfide rubber sealant formulation; the chlorinated hydrocarbon plasticizer having a viscosity of less than about 10,000 centipoises at 25° C. and having a heat loss value of less than about 0.5 weight percent; the liquid polysulfide polymer being thiol-terminated; and the polysulfide rubber sealant formulation being stable when cured.

5. An improved polysulfide rubber sealant formulation according to claim 1 wherein
the chlorinated hydrocarbon plasticizer consists essentially of a mixture of equal parts by weight of an alpha-olefin containing 16 carbon atoms per molecule and an alpha-olefin containing 20 carbon atoms per molecule;
the chlorine content of the chlorinated mixture ranges from 52 to 55 weight percent; and
the chlorinated mixture has a viscosity of less than about 25,000 centipoises at 25° C. and has a heat loss value of less than about 0.5 weight percent.

6. An improved polysulfide rubber sealant formulation comprising
a liquid polysulfide polymer;
a chlorinated hydrocarbon plasticizer in an amount effective to plasticize said polysulfide polymer and consisting essentially of a chlorinated alpha-olefin containing 18 carbon atoms per molecule; the chlorine content of the chlorinated alpha-olefin ranging from 54 to 55.5 weight percent; the chlorinated hydrocarbon plasticizer having a viscosity of less than about 30,000 centipoises at 25° C., a heat loss value of less than about 0.5 weight percent and a combination of (a) number of carbon atoms per molecule and (b) chlorine content sufficient to provide a non-fogging and compatible plasticizer in a polysulfide rubber sealant formulation;
a pigment;
a retarding agent; and
a filler;
the polysulfide rubber sealant formulation being stable when cured, the curing being effected by the incorporation of an effective amount of a curing agent.

7. An improved polysulfide rubber sealant formulation comprising
100 parts by weight of a thiol-terminated polysulfide polymer;
from about 25 to about 100 parts by weight of a chlorinated hydrocarbon plasticizer consisting essentially of a chlorinated alpha-olefin containing 18 carbon atoms per molecule; the chlorine content of the chlorinated alpha-olefin ranging from 54 to 55.5 weight percent; the chlorinated hydrocarbon plasticizer having a viscosity of less than about 30,000 centipoises at 25° C., a heat loss value of less than about 0.5 weight percent and a combination of (a) number of carbon atoms per molecule and (b) chlorine content sufficient to provide a non-fogging and compatible plasticizer in a polysulfide rubber sealant formulation;
from about 5 to about 20 parts by weight of a titanium dioxide pigment;
from about 0.1 to about 5 parts by weight of a stearic acid retarding agent; and
from about 25 to about 100 parts by weight of a filler selected from the group consisting of carbon black, clay, and calcium carbonate;
the polysulfide rubber sealant formulation being stable when cured, the curing being effected by the incorporation of from about 5 to about 10 parts by weight of a curing paste comprising equal parts by weight of lead dioxide and phthalate ester.

8. An improved polysulfide rubber sealant formulation comprising
a liquid polysulfide polymer;
a chlorinated hydrocarbon plasticizer in an amount effective to plasticize said polysulfide polymer and consisting essentially of a chlorinated alpha-olefin containing 16 carbon atoms per molecule; the chlorine content of the chlorinated alpha-olefin ranging from 54 to 55.5 weight percent; the chlorinated hydrocarbon plasticizer having a viscosity of less than about 10,000 centipoises at 25° C., a heat loss value of less than about 0.5 weight percent and a combination of (a) number of carbon atoms per molecule and (b) chlorine content sufficient to provide a non-fogging and compatible plasticizer in a polysulfide rubber sealant formulation;
a pigment;
a retarding agent; and
a filler;
the polysulfide rubber sealant formulation being stable when cured, the curing being effected by the incorporation of an effective amount of a curing agent.

9. An improved polysulfide rubber sealant formulation comprising
about 100 parts by weight of a thiol-terminated polysulfide polymer;
from about 25 to about 100 parts by weight of a chlorinated hydrocarbon plasticizer consisting essentially of a chlorinated alpha-olefin containing 16 carbon atoms per molecule; the chlorine content of the chlorinated alpha-olefin ranging from 54 to 56 weight percent; the chlorinated hydrocarbon plasticizer having a viscosity of less than about 10,000 centipoises at 25° C., a heat loss value of less than about 0.5 weight percent and a combination of (a) number of carbon atoms per molecule and (b) chlorine content sufficient to provide a non-fogging and compatible plasticizer in a polysulfide rubber sealant formulation;

from about 5 to about 20 parts by weight of a titanium dioxide pigment;

from about 0.1 to about 5 parts by weight of a stearic acid retarding agent; and from about 25 to about 100 parts by weight of a filler selected from the group consisting of carbon black, clay, and calcium carbonate;

the polysulfide rubber sealant formulation being stable when cured, the curing being effected by the incorporation of from about 5 to about 10 parts by weight of a curing paste comprising equal parts by weight of lead dioxide and phthalate ester.

10. A method for preparing an improved polysulfide rubber sealant formulation comprising mixing together the liquid polysulfide polymer and chlorinated hydrocarbon plasticizer of claim 1.

11. A method for preparing an improved polysulfide rubber sealant formulation comprising mixing together the liquid polysulfide polymer and the chlorinated hydrocarbon plasticizer of claim 3.

12. A method for preparing an improved polysulfide rubber sealant formulation comprising mixing together the liquid polysulfide polymer and the chlorinated hydrocarbon plasticizer of claim 4.

13. A method for preparing the improved polysulfide rubber sealant formulation of claim 6 comprising chlorinating a hydrocarbon consisting essentially of an alpha-olefin containing 18 carbon atoms per molecule to a chlorine content ranging from 54 to 55.5 weight percent; mixing the chlorinated alpha-olefin together with a liquid polysulfide polymer, a pigment, a retarding agent and a filler to form a polysulfide rubber sealant formulation; and curing the polysulfide rubber sealant formulation by incorporating an effective amount of a curing agent.

14. A method for preparing the improved polysulfide rubber sealant formulation of claim 8 comprising chlorinating a hydrocarbon consisting essentially of an alpha-olefin containing 16 carbon atoms per molecule to a chlorine content of 54 to 55.5 weight percent; mixing the chlorinated alpha-olefin together with a liquid polysulfide polymer, a pigment, a retarding agent and a filler to form a polysulfide rubber sealant formulation; and curing the polysulfide rubber sealant formulation by incorporating an effective amount of a curing agent.

15. A method for preparing the improved polysulfide rubber sealant formulation of claim 7 comprising chlorinating a hydrocarbon consisting essentially of an alpha-olefin containing 18 carbon atoms per molecule to a chlorine content ranging from 54 to 55.5 weight percent; mixing from about 25 to about 100 parts by weight of the chlorinated alpha-olefin together with 100 parts by weight of a liquid polysulfide polymer, from about 25 to about 100 parts by weight of a filler selected from carbon black, clay, and calcium carbonate, from about 0.1 to about 5 parts by weight of a stearic acid retarding agent and from about 5 to about 20 parts by weight of a titanium dioxide pigment to form a polysulfide rubber sealant formulation; and curing the polysulfide rubber sealant formulation by incorporating from about 5 to about 10 parts by weight of a curing paste comprising equal parts by weight of phthalate ester and lead dioxide.

16. A method for preparing the improved polysulfide rubber sealant formulation of claim 9 comprising chlorinating a hydrocarbon consisting essentially of an alpha-olefin containing 16 carbon atoms per molecule to a chlorine content ranging from 54 to 55.5 weight percent; mixing from about 25 to about 100 parts by weight of the chlorinated alpha-olefin together with 100 parts by weight of a liquid polysulfide polymer, from about 25 to about 10 parts by weight of a filler selected from carbon black, clay and calcium carbonate, from about 0.1 to about 5 parts by weight of a stearic acid retarding agent and from about 5 to about 20 parts by weight of a titanium dioxide pigment to form a polysulfide rubber sealant formulation; and curing the polysulfide rubber sealant formulation by incorporating from about 5 to about 10 parts by weight of a curing paste comprising equal parts by weight of phthalate ester and lead dioxide.

* * * * *